Oct. 30, 1923. Re. 15,707
F. H. SIMONTON
COFFEE BREWING APPARATUS
Original Filed Dec. 10, 1918
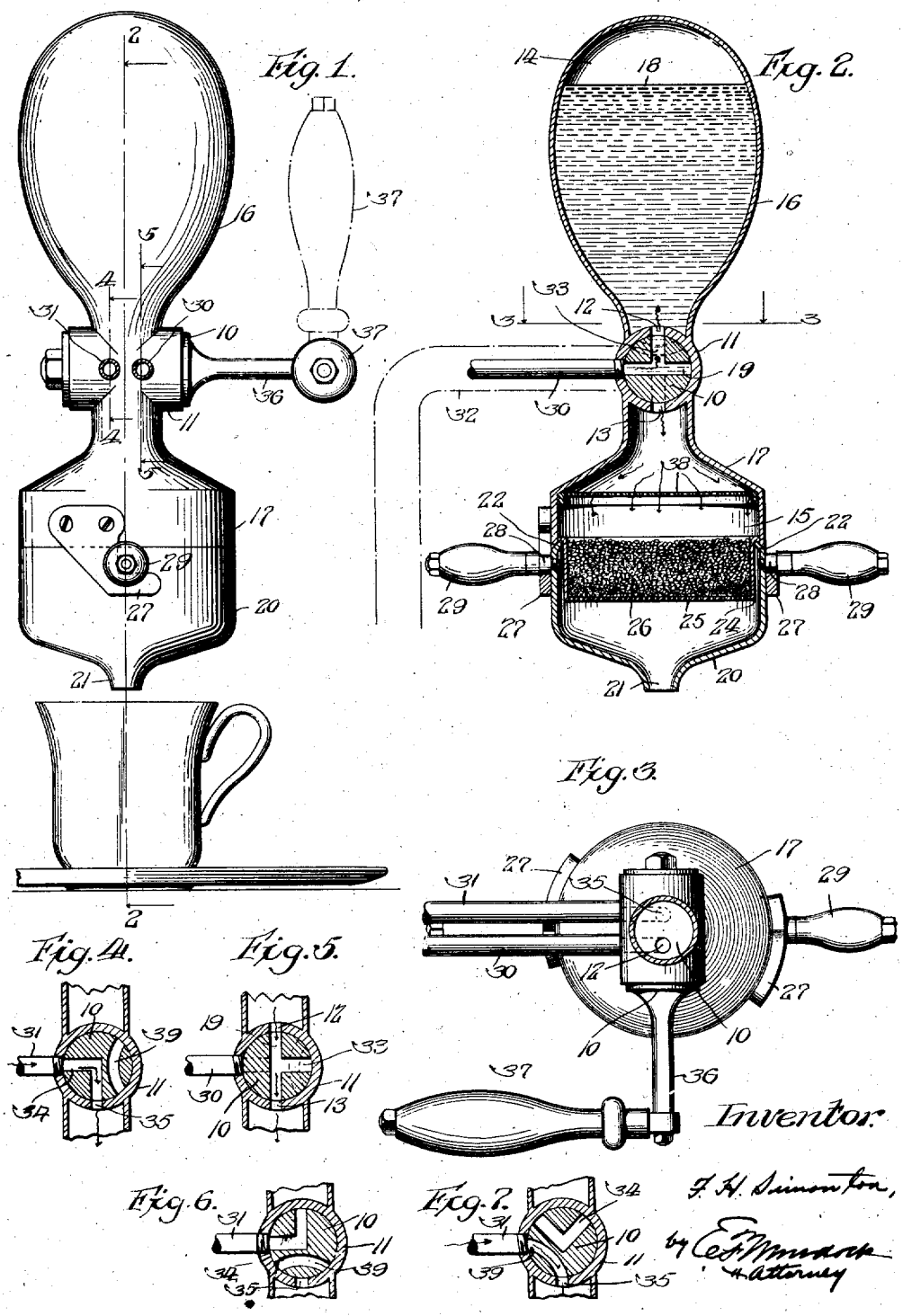

Reissued Oct. 30, 1923. Re. 15,707

UNITED STATES PATENT OFFICE.

FRANK H. SIMONTON, OF NEW YORK, N. Y., ASSIGNOR, BY DIRECT AND MESNE ASSIGNMENTS, OF THIRTY-EIGHT AND ONE-HALF PER CENT TO ALFRED A. SMITH AND TWENTY-FIVE PER CENT TO JOHN E. FERDINAND, JR., BOTH OF NEW YORK, N. Y.

COFFEE-BREWING APPARATUS.

Original application filed December 10, 1918, Serial No. 266,096. Renewed August 6, 1921, Serial No. 490,349. Original No. 1,409,123, dated March 7, 1922. Application for reissue filed November 15, 1922. Serial No. 601,156.

*To all whom it may concern:*

Be it known that I, FRANK H. SIMONTON, a citizen of the United States, and a resident of the city of New York, borough of Manhattan, in the county and State of New York, have invented a new and Improved Coffee-Brewing Apparatus, of which the following is a full, clear, and exact description.

Among the principal objects which the present invention has in view are: to provide means for brewing coffee or similar beverages for small consumption; to purvey small quantities of a table beverage for individual consumption; to vary the strength of said beverage; to provide for quickly brewing a small quantity of table beverage for individual consumption; and to proportion the quantity of the material from which the beverage is concocted to the demand for the beverage.

*Drawings.*

Figure 1 is a side view of an apparatus of the character mentioned constructed and arranged in accordance with the present invention, showing in conjunction therewith a receptacle for the beverage;

Figure 2 is a vertical section, the section being taken as on the line 2—2 in Fig. 1;

Figure 3 is a horizontal section, the section being taken as on the line 3—3 in Fig. 2;

Figure 4 is a detail view in section showing a fragment of the apparatus, the section being taken as on the line 4—4 in Fig. 1;

Figure 5 is a detail view in section, the section being taken as on the line 5—5 in Fig. 1;

Figures 6 and 7 are detailed views in section, showing the disposition of the controlling valve and steam ports therein arranged to permit the flow of steam and water to various parts of the apparatus.

*Description.*

As seen in the drawings, a rotary valve 10 is placed in a tubular valve casing 11, wherein ports 12 and 13 are provided for establishing communication between the water chamber 14 and the brewing chamber 15, when the water controlling valve passage is properly disposed. The pan holder 17 is cast from metal and is preferably integral with the valve casing 11. The container 16 is preferably constructed of glass and is open at the bottom only, so as to provide for an air space above the water 18, being trapped and compressed thereby as the water enters and fills the container. In practice the full volume of air in the container 16 is compressed at the upper end thereof, until the expansion force equals the head pressure of the water entering. It is obvious that when the valve 10 is turned to place the water channel 19 in communication with the container 16 and the chamber 15, the evacuation of the water 18 from the chamber 14 is quickly responsive to said disposition of the valve, the instant response of the water being due to the compressed air at the upper end of the chamber 16.

A pan 20 has a spout 21 centrally located therein. The pan 20 has an inturned flange 22, the upper surface of which is beveled to form a tight joint with the lower edge of the holder 17. The upper edge of the flange 22 forms a rest for the outturned flange 23 of the circular side of the cup 24. The cup 24 is furnished with a close meshed sieve bottom 25, upon which in practice the pulverized coffee rests. The pan 20 is removably attached to the holder 17, hooks 27 being provided for this purpose. The shanks 28 of handles 29 rise on the upper edges of the hooks 27, the said upper edges being slightly inclined to wedge the inclined surface of the flange 22 into intimate contact with the lower edge of the holder 17. When the pan 20 and the holder 17 are so connected, the chamber 15 is tightly closed except through the coffee 26 and spout 21.

Both water and steam are delivered to the chambers 14 and 15. To this end, two pipes 30 and 31 are provided. In service, the pipes 30 and 31 are enclosed within a jacket 32. The jacket 32 preferably forms a standard or support for the apparatus and may be secured to a wall or other fixed structure by any suitable means. The pipe 30 is connected with some source of boiling water. The pipe 31 is connected with a steam source.

The valve channels 19 and 33 are disposed in the same vertical plane and may coincide with the opening of the pipe 30 and the ports 12 and 13. The valve passage 34 is disposed in a vertical plane incorporating the opening of the steam pipe 31 and the port 35. As seen best in Fig. 3 of the drawings the port 35 is laterally disposed with reference to the ports 12 and 13. The valve 10 has a stem to which is connected an operating handle 37.

*Operation.*

The apparatus herein disclosed is designed primarily to meet the needs of restaurants where coffee is one of the staple articles dispensed.

Great difficulty is experienced in satisfying the individual tastes of a number and variety of customers. When equipped with a number of apparatuses such as herein described, a number of cups 24 are supplied or packed with pulverized coffee. When a demand is made for coffee, the waitress takes one of the packed cups and places it in the pan 20. To do this, she first removes the pan 20 by rotating the cup to the position where the handles 29 become disengaged from the hooks 27. When the cup 24 is placed in the pan 20, said pan is again placed in supported relation to the holder 17, being tightened by the hooks 27. The handle 37 is then turned from the position shown in broken lines in Figure 1 to the position shown in full lines in said figure. This latter position corresponds with the disposition of the valve 10, as seen in Figures 2 and 4. It will be observed that in this position, the port channels 19 and 33 are in communication with the pipe 30 and with the chamber 14, while simultaneously the port channel 34 has been placed in communication with the steam pipe 31 and the chamber 15. In these positions of the said port channels, boiling water is delivered to the chamber 14 and steam to the chamber 15. Water and steam continue to flow simultaneously until the water is arrested by the air pressure at the top of the chamber 14. When the operator observes that the water has ceased flowing, she moves the handle 37 to the position indicated by broken lines in Fig. 1, which position is shown best in Figures 5 and 6 of the drawings. In this position, it will be observed the steam supply is discontinued while the channel 19 is disposed to permit the water 18 to flow from the chamber 14 into the holder 17 and chamber 15 thereof to be spread on the plate 38 and thence precipitated upon the coffee 26.

During the period in which water is admitted to the chamber 14, steam is introduced into the chamber 15, with the effect that the coffee 26 in the cup 24 is cooked or preheated. When, now, the valve is turned so that the steam supply is discontinued and water previously delivered to the chamber 14 is transferred to the chamber 15, and coffee 26, the said coffee is quickly relieved of its essence and the water flows or drips through the coffee and into the pan 20, to be delivered thence by way of the nozzle 21 to the cup or other receptacle which has been placed thereunder.

If for any reason it is desired to further extract the essence or strength of the coffee, the valve 10 is moved to the position shown in Fig. 7 where the channel 39 is placed in communication with the steam pipe 31 and the port 35. In this position of the valve, the channels 34, 19 and 33 are out of register with any of the ports above referred to and steam only is delivered through the valve and to the chamber 15.

When the individual brew has been completed, the cup 24 is removed and suitable disposition is made of the coffee grounds.

From the foregoing it will be seen that the functioning of the present invention consists in providing means for preliminarily introducing steam into the body of the coffee for a definite period; then introducing heated water in predetermined quantity through the said coffee; and then again introducing steam into the body of the coffee. The result of the successive operations is that the body of the coffee is first saturated with a hot steam which prepares it to the best advantage to receive the hot water, and after being acted upon by the said hot water, the second introduction of steam eliminates the water from the body of the coffee.

While in the above specification I have described the container 16 and function thereof as a regulator for the amount of water to be used, it will be understood that other means commonly known to the art, may be employed for delivering to the body of coffee, the required amount of water without employing said chamber 16. Therefore I do not wish to be limited to an apparatus employing the said chamber 16.

*Claims.*

1. An apparatus as characterized comprising a receptacle having relatively small openings for holding pulverized coffee; a holder for said receptacle; an inverted container for a determinate quantity of liquid, said container being closed at the top; means including a valve having a plurality of communicating ducts therein for successively delivering water to said container and from said container to said receptacle, said water passing through said pulverized coffee therein, and a means for delivering steam under pressure to said receptacle simultaneously with the delivery of the water thereto so that the steam may force the water through the pulverized coffee.

2. An apparatus as characterized comprising a receptacle having relatively small openings for holding pulverized coffee; a holder for said receptacle; an inverted container for a determinate quantity of liquid, said container being closed at the top; means including a valve having a plurality of communicating ducts therein for successively delivering water to said container and from said container to said receptacle, said water passing through the pulverized coffee in said receptacle, a means including a valve having a plurality of independent ducts therein for delivering steam under pressure to said receptacle simultaneously with the delivery of the water thereto, and means for receiving the liquid after the same has been passed through the pulverized coffee to guide the same to a dispensing receptacle.

3. An apparatus as characterized comprising a receptacle having relatively small openings for holding pulverized coffee; a holder for said receptacle; an inverted top-closed container for a determinate quantity of water, said container being disposed in superposed relation to said receptacle; means including a valve having a plurality of communicating ducts therein for admitting liquid under pressure to said container, the flow of said liquid being arrested by the compression of air in said container; and means for at will delivering the liquid from said container to said receptacle and the pulverized coffee contained therein, and a means including a valve having a plurality of independent ducts therein for applying pressure to said receptacle after the water has been delivered thereto to force the water through the pulverized coffee.

4. An apparatus as characterized comprising a shallow cup-like receptacle having relatively small openings for holding a measured quantity of pulverized coffee; an inverted top-closed container for holding a measured quantity of water; a holder for said receptacle operatively connected with said container by means of a communicating passage; a controlling valve having a plurality of ducts placed in said passage; a heated water supply operatively connected to one of the ducts of said passage; a steam supply operatively connected with another one of the ducts in said passage; and a valve mounted in said passage for controlling the flow of water and steam through said passage, so that when turned in one direction, the water and steam will first be delivered simultaneously to the container and when moved to another position, the incoming water and steam will be cut off and the water now trapped in the upper portion of the container will be delivered to the lower portion of the container together with the trapped steam supply which will force the water downwardly through the coffee contained within the receptacle.

5. An apparatus as characterized comprising a shallow cup-like receptacle having relatively small openings for holding a measured quantity of pulverized coffee; an inverted top-closed container for holding a measured quantity of water; a holder for said receptacle operatively connected with said container by means of a communicating passage; a controlling valve placed in said passage; a steam supply operatively connected with said passage; and a valve mounted in said passage for controlling the flow of water and steam through said passage, said valve having port channels formed therein for delivering said water to said container simultaneously with the delivery of steam to said receptacle, said valve being further provided with a channel for the delivery of steam to said receptacle during the period when the water supply is discontinued from said container.

6. An apparatus as characterized comprising a continuous-wall inverted container having a receiving and a delivery opening at the lower end thereof; a holder for ground coffee adapted to be held beneath said container; a water supply for said container having manually controlled means for introducing water thereinto through the receiving opening at the lower end thereof; and a steam supply having means for at will directing said steam supply upon the coffee in said receptacle and to said container simultaneously with the introduction of the water to the latter.

7. An apparatus as characterized comprising a cup-like receptacle having relatively small openings for holding a measured quantity of comminuted coffee; a holder for said receptacle having a delivery opening; means completely covering said receptacle for providing a space thereabove; and means for successively introducing upon said coffee, first a supply of steam simultaneously with a supply of water, and then a further supply of steam.

8. An apparatus as characterized comprising a cup-like receptacle having relatively small openings for holding a measured quantity of comminuted coffee; a holder for said receptacle having a delivery opening; means completely covering said receptacle for providing a space thereabove; and manually controlled means for successively introducing upon said coffee, first a supply of steam simultaneously with a supply of water, and then a further supply of steam.

9. An apparatus as characterized comprising a cup-like receptacle having relatively small openings for holding a measured quantity of comminuted coffee; a holder for said receptacle having a delivery opening; means completely covering said receptacle for providing a space thereabove; and means for successively introducing upon said coffee, first a supply of steam, then a supply of water and simultaneously with a further supply of steam, said means being adapted to terminate the delivery of each of said supplies when operated to deliver the other of said supplies to said coffee.

10. An apparatus as characterized comprising a closed-top holder operatively communicating with a supply of heated water and a supply of steam; a pan for holding comminuted coffee in the path of said water and steam when the same are simultaneously admitted to said holder; and means for successively and simultaneously placing said supply of steam and supply of water in communication with the interior of said holder.

FRANK H. SIMONTON.